US008599702B2

(12) United States Patent
Kim et al.

(10) Patent No.: US 8,599,702 B2
(45) Date of Patent: Dec. 3, 2013

(54) DATA TRANSMISSION METHOD IN WIRELESS COMMUNICATION SYSTEM BASED ON TDD

(75) Inventors: Hak Seong Kim, Seoul (KR); Bong Hoe Kim, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 12/672,500

(22) PCT Filed: Aug. 13, 2008

(86) PCT No.: PCT/KR2008/004691
§ 371 (c)(1),
(2), (4) Date: Feb. 5, 2010

(87) PCT Pub. No.: WO2009/022849
PCT Pub. Date: Feb. 19, 2009

(65) Prior Publication Data
US 2011/0188381 A1  Aug. 4, 2011

(30) Foreign Application Priority Data

Aug. 14, 2007 (KR) .................. 10-2007-0081915

(51) Int. Cl.
*H04W 72/04* (2009.01)
(52) U.S. Cl.
USPC ........... 370/242; 370/280; 370/329; 714/749; 455/509
(58) Field of Classification Search
USPC ......... 370/230, 242, 276, 280, 299, 328–330, 370/207, 441; 375/261; 714/748–749; 257/130; 455/502, 509
See application file for complete search history.

(56) References Cited

U.S. PATENT DOCUMENTS

| 6,665,308 | B1 * | 12/2003 | Rakib et al. | 370/441 |
|---|---|---|---|---|
| 7,230,931 | B2 * | 6/2007 | Struhsaker | 370/280 |
| 7,774,686 | B2 * | 8/2010 | Ahn et al. | 714/776 |
| 8,149,938 | B2 * | 4/2012 | Shen et al. | 375/261 |
| 8,184,731 | B2 * | 5/2012 | Qian et al. | 375/261 |
| 2004/0075103 | A1 * | 4/2004 | Topp et al. | 257/130 |
| 2004/0110473 | A1 | 6/2004 | Rudolf et al. | |
| 2004/0180679 | A1 * | 9/2004 | Porter | 455/502 |
| 2005/0201319 | A1 | 9/2005 | Lee et al. | |
| 2006/0036922 | A1 * | 2/2006 | Hong et al. | 714/748 |
| 2006/0045010 | A1 * | 3/2006 | Baker et al. | 370/230 |
| 2007/0097887 | A1 * | 5/2007 | Kim et al. | 370/276 |
| 2007/0268814 | A1 * | 11/2007 | Li | 370/207 |
| 2008/0080423 | A1 * | 4/2008 | Kolding et al. | 370/329 |
| 2008/0095106 | A1 * | 4/2008 | Malladi et al. | 370/329 |
| 2008/0130526 | A1 * | 6/2008 | Che | 370/280 |
| 2008/0165893 | A1 * | 7/2008 | Malladi et al. | 375/299 |

(Continued)

*Primary Examiner* — Michael Thier
*Assistant Examiner* — Vincelas Louis
(74) *Attorney, Agent, or Firm* — Lee, Hong, Degerman, Kang & Waimey

(57) ABSTRACT

A method of transmitting data in time division duplex (TDD) system is provided. The method includes configuring a radio frame, the radio frame comprising downlink subframes and an uplink subframe, wherein the downlink subframes are assigned for downlink transmission and the uplink subframe is assigned for uplink transmission, transmitting downlink data on the downlink subframes, and receiving in the uplink subframe acknowledgement (ACK)/negative-acknowledgement (NACK) signals corresponding to the downlink subframes, wherein at least one of the downlink subframes includes an indicator, the indicator indicating transmission of other downlink subframes than the at least one of the downlink suframes. A basic rule about allocation of uplink subframes and downlink subframes can be provided.

8 Claims, 14 Drawing Sheets

(56) References Cited

U.S. PATENT DOCUMENTS

| | | |
|---|---|---|
| 2008/0225791 A1* | 9/2008 | Pi et al. .......................... 370/330 |
| 2008/0301515 A1* | 12/2008 | Sagfors et al. ................ 714/748 |
| 2009/0073922 A1* | 3/2009 | Malladi et al. ................ 370/328 |
| 2009/0241004 A1* | 9/2009 | Ahn et al. ...................... 714/749 |
| 2011/0096693 A1* | 4/2011 | Astely et al. ................... 370/252 |
| 2012/0294207 A1* | 11/2012 | Ahn et al. ...................... 370/280 |
| 2013/0107842 A1* | 5/2013 | Fan et al. ...................... 370/329 |

* cited by examiner

DATA TRANSMISSION METHOD IN WIRELESS COMMUNICATION SYSTEM BASED ON TDD

CROSS-REFERENCE TO RELATED APPLICATIONS

This application is the National Stage filing under 35 U.S.C. 371 of International Application No. PCT/KR2008/004691, filed on Aug. 13, 2008, which claims the benefit of earlier filing date and right of priority to Korean Application No. 10-2007-0081915, filed on Aug. 14, 2007.

TECHNICAL FIELD

The present invention relates to a wireless communication, and more specifically, to a data transmission method in a wireless communication system based on time division duplex (TDD).

BACKGROUND ART

Wireless communication systems can be largely divided into a frequency division duplex (FDD) scheme and a time division duplex (TDD) scheme. Uplink transmission and downlink transmission occupy frequency bands different from each other in the FDD scheme, and uplink transmission and downlink transmission occupy the same frequency band in different time in the TDD scheme. In the TDD scheme, channel response is mutual dependent. That is, a downlink channel response is the same as an uplink channel response in a given time-frequency. Accordingly, a wireless communication system of a TDD scheme is advantageous in that the downlink channel response can be obtained from the uplink channel response.

According to a hybrid automatic repeat request (HARQ) scheme, performance is enhanced by confirming whether data received by the physical layer contains an error that cannot be decoded and requesting retransmission if there is an error. If no error is detected in the received data, the receiver transmits an ACK signal as a response signal to inform the transmitter of success of receiving the data. If an error is detected in the received data, the receiver transmits a NACK signal as a response signal to inform the transmitter of detection of the error. If the NACK signal is received, the transmitter may retransmit the data.

In a TDD system, one radio frame includes at least one downlink subframe and at least one uplink subframe. An ACK/NACK signal, which is a response to downlink data transmission, should be transmitted for each downlink subframe. Since the ACK/NACK signals need high reliability, it is general that the number of ACK/NACK signals that can be transmitted on one control channel is limited. Downlink channel needs to be scheduled in accordance with the ACK/NACK signal.

There needs a method that can efficiently schedule downlink data within limited radio resources in a TDD system.

DISCLOSURE OF INVENTION

Technical Problem

The present invention provides a method of allocating an uplink subframe and a downlink subframe. The present invention also provides a method of handling errors in a downlink subframe.

Technical Solution

According to an embodiment of the invention, a method of transmitting data in time division duplex (TDD) system is provided. The method includes configuring a radio frame, the radio frame comprising downlink subframes and an uplink subframe, wherein the downlink subframes are reserved for downlink transmission and the uplink subframe is reserved for uplink transmission, transmitting downlink data on the downlink subframes, and receiving acknowledgement (ACK)/negative-acknowledgement (NACK) signals for the downlink subframes on the uplink subframe, wherein at least one of the downlink subframes includes an indicator, the indicator indicating transmission of other downlink subframes than the at least one of the downlink suframes.

According to an embodiment of the invention, a method of transmitting feedback information in time division duplex (TDD) system is provided. The method includes receiving downlink data on at least one downlink subframe, and transmitting an ACK/NACK signal for the downlink data on an uplink subframe, wherein the at least one the downlink subframe includes an indicator for informing transmission of other downlink subframes.

Advantageous Effects

In a wireless communication based on time division duplex (TDD), a basic rule about allocation of uplink subframe(s) and downlink subframe(s) is provided. Furthermore, a user equipment (UE) and a base station (BS) can properly handle an error in downlink subframe(s).

MODE FOR THE INVENTION

Hereinafter, exemplary embodiments of the present invention will be described in detail with reference to the accompanying drawings so that this disclosure can be thorough and complete, and will fully convey the concept of the invention to those skilled in the art.

Figure 1:
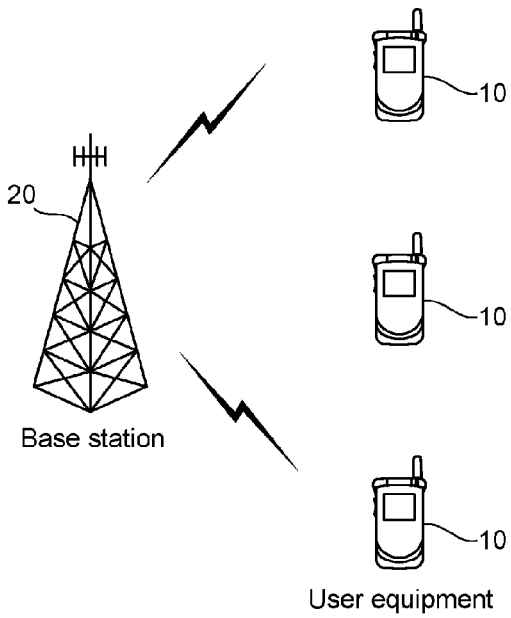
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 10 and at least one user equipment (UE) 20. The BS 10 is generally a fixed station that communicates with the UE 20 and may be referred to as another terminology, such as a node-B, a base transceiver system (BTS), an access point, etc. There are one or more cells within the coverage of the BS 10. The UE 20 may be fixed or mobile, and may be referred to as another terminology, such as a mobile station (MS), a user terminal (UT), a subscriber station (SS), a wireless device, etc.

A downlink represents a communication link from the BS 10 to the UE 20, and an uplink represents a communication link from the UE 20 to the BS 10. In the downlink, a transmitter may be a part of the BS 10, and a receiver may be a part of the UE 20. In the uplink, the transmitter may be a part of the UE 20, and the receiver may be a part of the BS 10.

Figure 2:
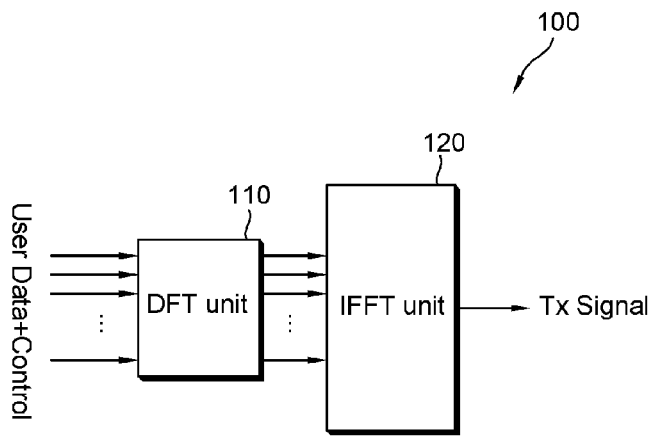
FIG. 2 is a block diagram showing a transmitter according to an embodiment of the present invention.

FIG. 2 is a block diagram showing a transmitter according to an embodiment of the present invention.

Referring to FIG. 2, the transmitter 100 comprises a DFT unit 110 for performing Discrete Fourier Transform (DFT) and an IFFT unit 120 for performing Inverse Fast Fourier Transform (IFFT). The DFT unit 110 performs DFT on inputted data and outputs frequency domain symbols. The data inputted into the DFT unit 110 may be a control signal and/or user data. The IFFT unit 120 performs IFFT on inputted frequency domain symbols and outputs transmit signals (Tx signals). The transmit signals becomes time domain signals. The time domain symbols outputted from the IFFT unit 120 are referred to as Orthogonal Frequency Division Multiplexing (OFDM) symbols or Single Carrier-Frequency Division Multiple Access (SC-FDMA) symbols. A method for performing DFT at the front end of the IFFT unit 120 and diffusing the symbols is referred as SC-FDMA, and the method is advantageous in lowering a Peak-to-Average Power Ratio (PAPR) compared with OFDM.

Any multiple access technique may be applied to the present invention although the SC-FDMA scheme is described here. For example, a variety of multiple access techniques, such as Code Division Multiple Access (CDMA), Time Division Multiple Access (TDMA), Frequency Division Multiple Access (FDMA), Single-Carrier FDMA (SC-FDMA), and Orthogonal Frequency Division Multiple Access (OFDMA), can be used.

Multiple access techniques of uplink and downlink can be different from each other in a wireless communication system. For example, the uplink may use SC-FDMA, and the downlink may use OFDMA.

I. Scheduling Restriction on Radio Frame Structure 1

Figure 3:
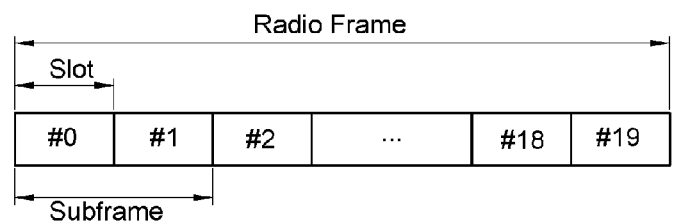
FIG. 3 shows an example of a wireless frame structure.

FIG. 3 shows an example of a wireless frame structure.

Referring to FIG. 3, a radio frame includes ten subframes. A subframe can be assigned for uplink transmission or downlink transmission. A subframe assigned for uplink transmission is called an uplink subframe and a subframe assigned for downlink transmission is called a downlink subframe. The 0-th and fifth subframes can be allocated always for downlink transmission.

The uplink transmission and the downlink transmission ie performed by the unit of a subframe in the TDD scheme. The radio frame includes at least one downlink subframe and at least one uplink subframe.

Figure 4:
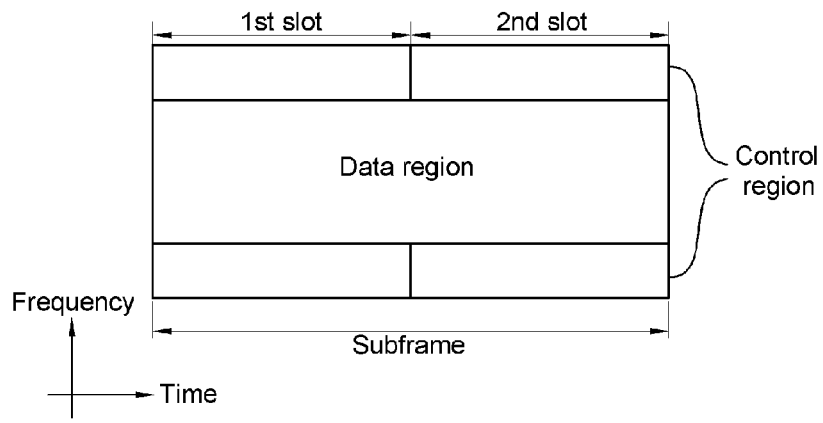
FIG. 4 shows an example of a subframe. This may be an uplink subframe.

FIG. 4 shows an example of a subframe. This may be an uplink subframe.

Referring to FIG. 4, one subframe may include two slots. One slot may include a plurality of OFDM symbols in the time domain and at least one subcarrier in the frequency domain. The slot may be used as a unit for allocating radio resources in the time and frequency domains. For example, one slot may include seven or six OFDM symbols.

The subframe can be divided into a control region and a data region. The control region is a region for transmitting only control signals, which is generally allocated to a control channel. The data region is a region for transmitting data, which is generally allocated to a data channel. The control channel is a channel for transmitting control signals, and the data channel is a channel for transmitting user data. The control channel and the data channel can be configured as a subframe. An ACK/NACK signal is a control signal transmitted on the control channel.

Although only control signals are loaded on the control region, user data can be loaded on the data region together with control signals. That is, when a user equipment transmits only control signals, the user equipment is allocated with a control region and transmits the control signals, and when the user equipment transmits data together with control signals, the user equipment may be allocated with a data region and transmit the data and control signals. Exceptionally, although the user equipment transmits only control signals, if the amount of the control signals is large or the control signals are inappropriate to be transmitted on a control region, the user equipment can be allocated with radio resources on a data region and transmit the control signals.

Since the control region and the data region use frequency bands different from each other, they are multiplexed in Frequency Division Multiplexing (FDM). However, this is merely an example, and allocation of the control region and data region on a subframe is not limited.

From the view point of a user equipment, each slot in a subframe can be divided into two portions in the frequency domain. When a first subframe is divided into a first slot and a second slot, the first slot is divided into a first region and a second region in the frequency domain, and the second slot also can be divided into a first region and a second region in the frequency domain. When it is assumed that the first region transmits control signals and the second region transmits user data in the first slot, the first region may transmit the user data and the second region may transmit the control signals in the second slot. If there are many terminals, although both of the first and second regions may transmit control signals in the first slot, a user does not simultaneously use both of the common resource regions.

Slots allocated to each user equipment may be frequency hoped on a subframe. That is, one of two slots included in one subframe is allocated to the frequency band of one side, and the other slot may be allocated to the frequency band of the other side to be offset against each other. A control channel for a user equipment is transmitted on slots allocated to frequency bands different from each other, and thus a frequency diversity gain may be obtained.

The radio frame structure is merely an example, and the number of subframes included in a radio frame, the number of slots included in a subframe, and the number of OFDM symbols included in a slot can be diversely modified.

In the TDD system described above, one radio frame includes one or more downlink subframes and one or more uplink subframes. If it is assumed that HARQ is applied, an ACK/NACK signal should be transmitted as a response to the downlink subframe. If it is considered that one ACK/NACK signal is transmitted for one downlink subframe, when N downlink subframes are allocated to a user, N ACK/NACK signals should be transmitted on the uplink subframe.

It is restricted to transmit the ACK/NACK signals on one uplink subframe regardless of the form of the radio frame structure. Hereafter, methods of scheduling downlink data depending on a variety of modulation orders are described.

Figure 5:
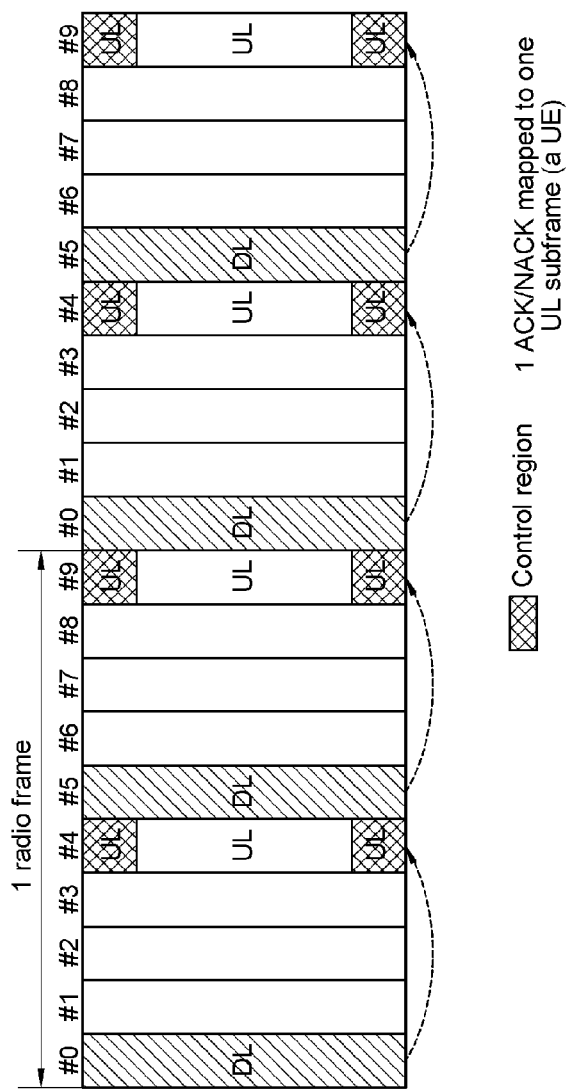
FIG. 5 is an exemplary view showing a scheduling method according to an embodiment of the present invention in a TDD system using one transmit antenna.
Figure 6:
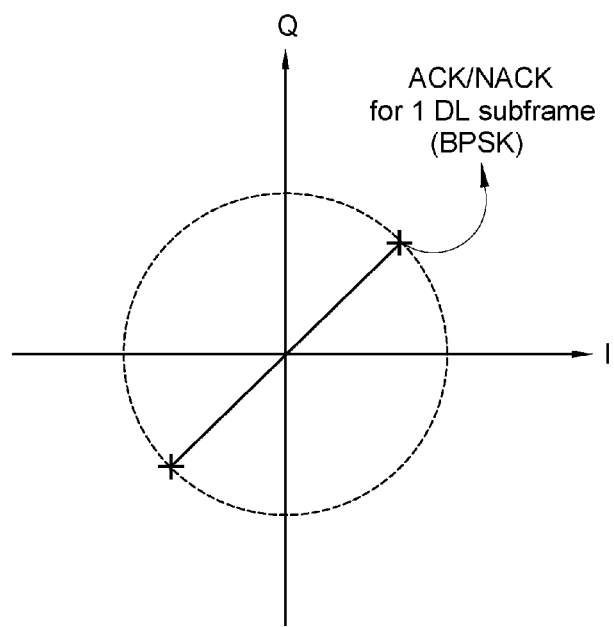
FIG. 6 shows a constellation diagram for an ACK/NACK signal in Binary Phase Shift Keying (BPSK) modulation.

FIG. 5 is an exemplary view showing a scheduling method using one transmit antenna in a TDD system according to an embodiment of the present invention. FIG. 6 is a constellation diagram for an ACK/NACK signal in Binary Phase Shift Keying (BPSK) modulation.

When one transmit antenna is used, one downlink subframe transmits one downlink data. Accordingly, one ACK/NACK signal is needed for one downlink subframe. As shown in FIG. 6, when BPSK modulation is used for the ACK/NACK signal, the ACK signal has a phase difference of $\pi$ from the NACK signal. Here, although the ACK/NACK signal is slanted by $\pi/4$ for channel I, it is merely an example.

Referring to FIG. 5, when BPSK modulation is used for one downlink subframe, one uplink subframe is needed to transmit an ACK/NACK signal. It is because one ACK/NACK signal is mapped to one downlink subframe. For example, an ACK/NACK signal for the 0-th subframe, which is a downlink subframe, is transmitted on a control channel allocated to the control region of the 4-th subframe, which is an uplink subframe.

Here, although the 0-th and 5-th subframe are downlink subframes and the 4-th and 9-th subframe are uplink subframes, this is merely an example.

In a Single Input Single Output (SISO) or Single Input Multiple Output (SIMO) system that uses one transmit antenna, if a 1-bit ACK/NACK signal modulated in BPSK is transmitted as a response to downlink data, allocation of subframes needs to be restricted depending on a ratio of uplink subframes to downlink subframes according to each user.

When BPSK modulation is used, subframes can be allocated in the manner of (1, ~1), (2, ~2), (3, ~3), (4, ~4), (5, ~5), (6, ~4), (7, ~3), (8, ~2), and (9, ~1). For (m, n), m denotes the number of allocated uplink subframes, and n denotes the number of downlink subframes restricted depending on the number of allocated uplink subframes. ~n denotes maximum number of downlink subframes that can be allocated. (1, ~1) means that the number of allocated uplink subframes is one and the number of maximum downlink subframes that can be allocated is one.

The number of ACK/NACK signals that can be transmitted on an uplink subframe by a user is limited to one when BPSK modulation is used. Since two or more ACK/NACK signals cannot be transmitted on one uplink subframe, accordingly, it is preferable to limit the downlink subframe needed for transmission of downlink data to one. That is, if the number of uplink subframes m is determined, the number of maximum downlink subframes n that can be transmitted on downlink is determined accordingly, and downlink transmission and uplink transmission are scheduled based on this rule. Contrarily, if there are more uplink data than downlink data (e.g., (6, 4), ..., (9, 1), etc), there are sufficient subframes that can transmit ACK/NACK signals, and thus it does not need to limit the downlink subframes particularly.

When Quadrature Phase Shift Keying (QPSK) modulation is used, subframes can be allocated in the manner of (1, ~2), (2, ~4), (3, ~6), (4, ~6), (5, ~5), (6, ~4), (7, ~3), (8, ~2), and (9, ~1). The QPSK modulation can be used in order to mitigate restriction in BPSK to some extent. Since a 2-bit signal can be transmitted in QPSK, two 1-bit ACK/NACK signals can be simultaneously transmitted. Accordingly, for one user, ACK/NACK signals for two downlink subframes can be transmitted using one uplink subframe.

When 8PSK modulation is used, subframes can be allocated in the manner of (1, ~3), (2, ~6), (3, ~7), (4, ~6), (5, ~5), (6, ~4), (7, ~3), (8, ~2), and (9, ~1). Since a 3-bit signal can be transmitted in 8PSK, three 1-bit ACK/NACK signals can be simultaneously transmitted. Accordingly, on the basis of one user, ACK/NACK signals can be transmitted for three downlink subframes using one uplink subframe.

When 16 Quadrature amplitude (16QAM) modulation is used, subframes can be allocated in the manner of (1, ~4), (2, ~8), (3, ~7), (4, ~6), (5, ~5), (6, ~4), (7, ~3), (8, ~2), and (9, ~1). Since a 4-bit signal can be transmitted in 16QAM, four 1-bit ACK/NACK signals can be simultaneously transmitted. Accordingly, on the basis of one user, ACK/NACK signals can be transmitted for four downlink subframes using one uplink subframe.

Although examples of BPSK, QPSK, 8PSK and 16QAM are described here, those skilled in the art may easily apply the spirit of the present invention to higher modulation orders.

Figure 7:
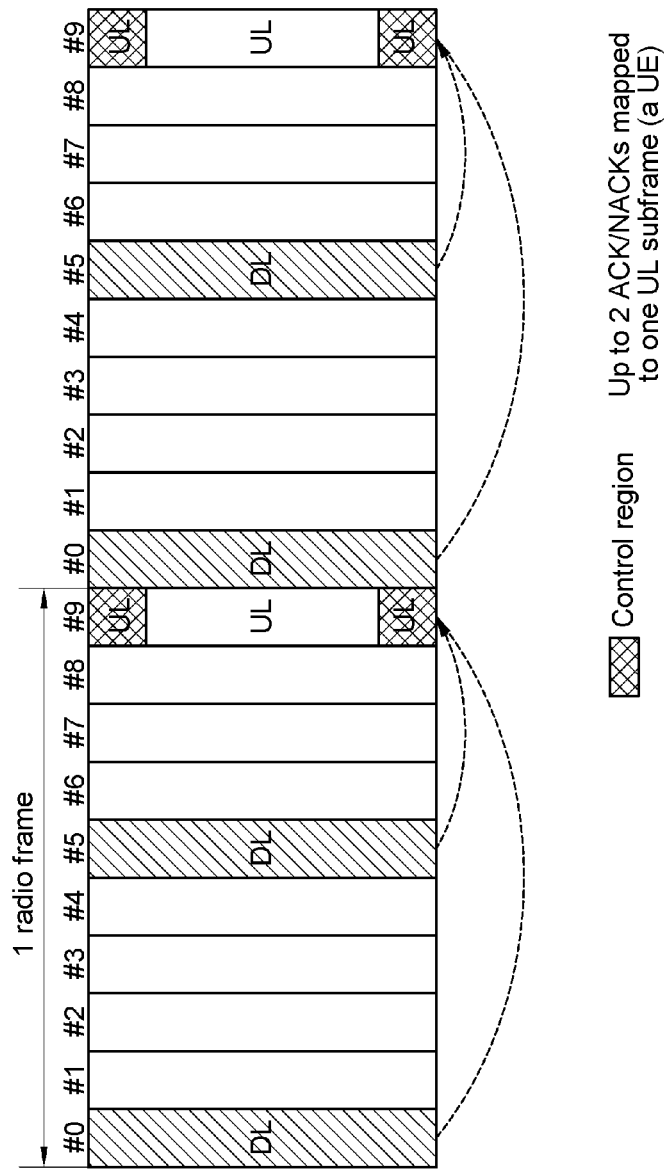
FIG. 7 is an exemplary view showing a scheduling method according to an embodiment of the present invention in a TDD system of rank 1 using multiple transmit antennas.
Figure 8:
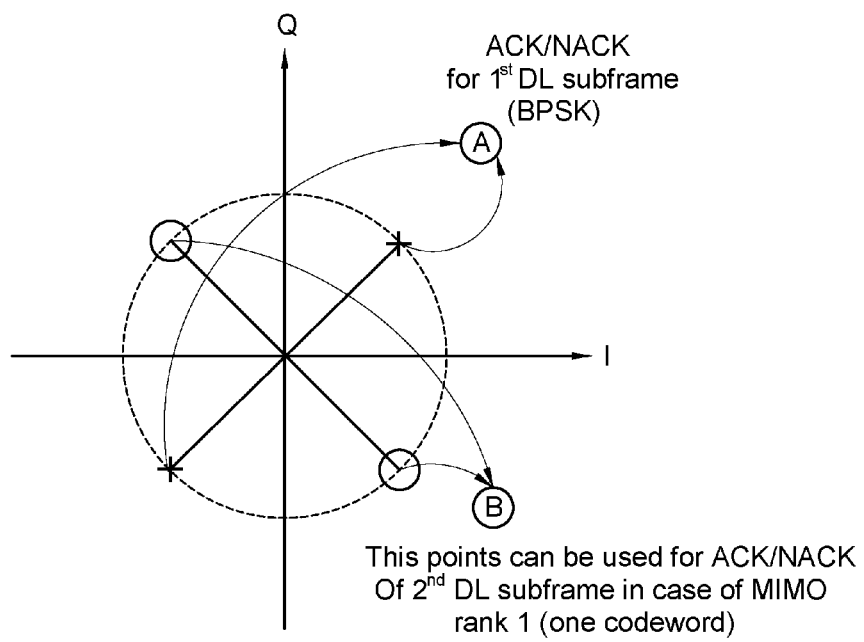
FIG. 8 shows a constellation diagram for an ACK/NACK signal in BPSK modulation.

FIG. 7 is an exemplary view showing a scheduling method in a TDD system of rank 1 using multiple transmit antennas according to an embodiment of the present invention. FIG. 8 shows a constellation diagram for an ACK/NACK signal in BPSK modulation.

Although a plurality of data (or codewords) can be transmitted when multiple transmit antennas are used, one downlink data is transmitted in one downlink subframe in the case of rank 1. Accordingly, one ACK/NACK signal is needed for one downlink subframe. As shown in FIG. 8, when BPSK modulation is used for the ACK/NACK signal, the ACK signal has a phase difference of $\pi$ from the NACK signal. In addition, although BPSK modulation is used, two ACK/NACK signals can be transmitted through $\pi/2$ rotation. A first ACK/NACK signal can be used as a second ACK/NACK signal by rotating constellation points as much as $\pi/2$ for the first ACK/NACK signal. That is, maximum two ACK/NACK signals can be simultaneously transmitted using BPSK modulation.

Referring to FIG. 7, when BPSK modulation is used for two downlink subframes in a multiple antenna system of rank 1, one uplink subframe is needed to transmit two ACK/NACK signals. It is since that two ACK/NACK signals are mapped to two downlink subframes. For example, ACK/NACK signals for the 0-th and 5-th subframes, which are downlink subframes, are transmitted on a control channel allocated to the control region of the 9-th subframe, which is an uplink subframe.

In a Multiple Input Single Output (MISO) or Multiple Input Multiple Output (MIMO) system that uses multiple transmit antennas, if a 1-bit ACK/NACK signal modulated in BPSK is transmitted as a response to downlink data, allocation of subframes needs to be restricted depending on a ratio of uplink subframes to downlink subframes, which are practically allocated to each user.

When BPSK modulation is used, subframes can be allocated in the manner of (1, ~2), (2, ~4), (3, ~6), (4, ~6), (5, ~5), (6, ~4), (7, ~3), (8, ~2), and (9, ~1). Since ACK/NACK signals for maximum two downlink subframes can be transmitted on a control channel allocated one uplink subframe, when N uplink subframes are allocated, 2N downlink subframes can be supported. Or, one ACK/NACK signal can be transmitted through BPSK modulation. Then, subframes can be allocated in the manner of (1, ~1), (2, ~2), (3, ~3), (4, ~4), (5, 5), (6, ~4), (7, ~3), (8, ~2), and (9, ~1).

Here, although it is described as an example that two ACK/NACK signals are simultaneously transmitted through BPSK modulation in a multiple antenna system of rank 1, two ACK/NACK signals can be transmitted on one uplink subframe in a single antenna system.

When QPSK modulation is used, subframes can be allocated in the manner of (1, ~2), (2, ~4), (3, ~6), (4, ~6), (5, ~5), (6, ~4), (7, ~3), (8, ~2), and (9, ~1). Since a 2-bit signal can be transmitted in QPSK, two 1-bit ACK/NACK signals can be simultaneously transmitted. Accordingly, on the basis of one user, ACK/NACK signals for two downlink subframes can be transmitted using one uplink subframe.

Figure 9:
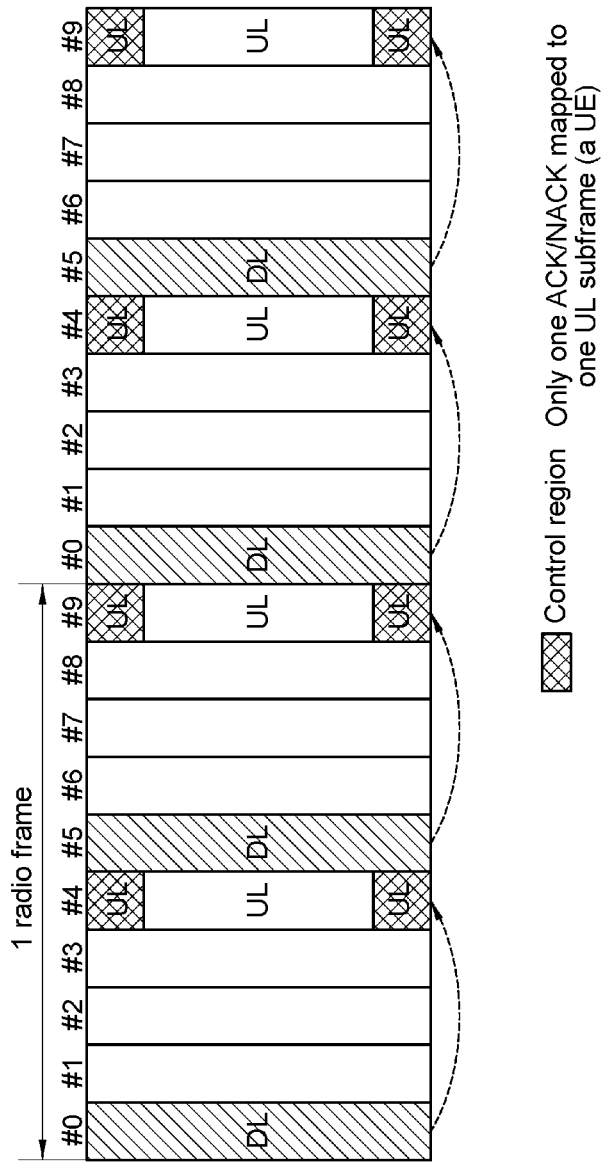
FIG. 9 is an exemplary view showing a scheduling method according to an embodiment of the present invention in a TDD system of rank 2 using multiple transmit antennas.
Figure 10:
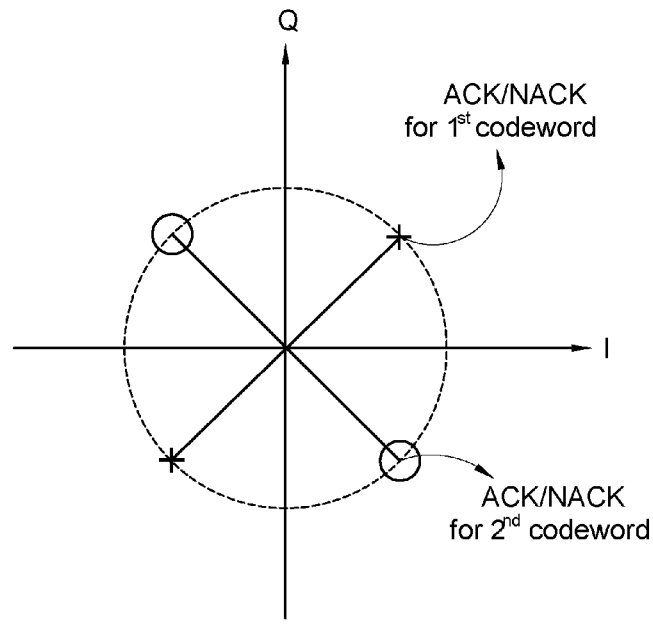
FIG. 10 shows a constellation diagram for an ACK/NACK signal in QPSK modulation.

FIG. 9 is an exemplary view showing a scheduling method in a TDD system of rank 2 using multiple transmit antennas according to an embodiment of the present invention. FIG. 10 shows a constellation diagram for an ACK/NACK signal in QPSK modulation.

A plurality of data (codewords) can be transmitted when multiple transmit antennas are used, and one downlink subframe transmits two codewords in the case of rank 2. Accordingly, two ACK/NACK signals for respective codewords are needed for one downlink subframe. As shown in FIG. 10, QPSK or a higher order modulation can be used to transmit two ACK/NACK signals. Two ACK/NACK signals are simultaneously transmitted using QPSK modulation.

Referring to FIG. 9, when QPSK modulation is used for one downlink subframe in a multiple antenna system of rank 2, one uplink subframe is needed to transmit two ACK/NACK signals. It is because two ACK/NACK signals are mapped to one downlink subframe. For example, an ACK/NACK signal for the 0-th subframe, which is a downlink subframe, is transmitted on a control channel allocated to the control region of the 4-th subframe, which is an uplink subframe.

When QPSK modulation is used, subframes can be allocated in the manner of (1, ~1), (2, ~2), (3, ~3), (4, ~4), (5, ~5), (6, ~4), (7, ~3), (8, ~2), and (9, ~1). Since a 2-bit signal can be transmitted in QPSK, two 1-bit ACK/NACK signals can be simultaneously transmitted. Accordingly, on the basis of one user, an ACK/NACK signal can be transmitted for one downlink subframe in one uplink subframe.

In the examples described above, ACK/NACK signals are transmitted on a control channel allocated to a control region. When there are uplink data, a plurality of ACK/NACK signals can be transmitted without specific scheduling restriction on a data channel. If the number of simultaneously transmitted ACK/NACK signals is limited, the scheduling restriction methods described above can be applied as they are.

II. Scheduling Restriction on Radio Frame Structure 2

Figure 11:
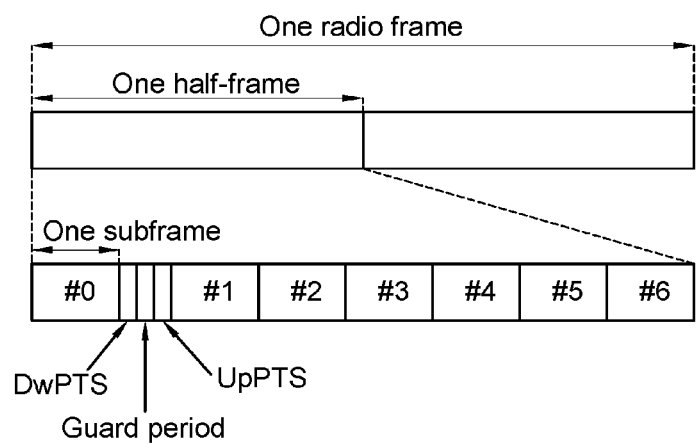
FIG. 11 shows another example of a wireless frame structure.

FIG. 11 shows another example of a wireless frame structure.

Referring to FIG. 11, a radio frame includes two half-frames. The structure of each half-frame is the same. The half-frame includes seven subframes and three field of a Downlink Pilot Time Slots (DwPTS), a guard period, and Uplink Pilot Time Slot (UpPTS). One subframe is defined as one slot. The subframe may be an uplink subframe or a downlink subframe. The 0-th subframe and DwPTS can be always used for downlink transmission, and the 1-st subframe and UpPTS can be always used for uplink.

DwPTS is used for initial cell search, synchronization, or channel estimation in a user equipment. UpPTS is used for channel estimation in a base station and uplink transmission synchronization in a user equipment. The guard period is a section for removing interference occurred in uplink due to multiple path delay of a downlink signal between the uplink and downlink.

In the TDD system described above, the number of half-frames included in a radio frame and the number of subframes included in a half-frame are merely an example.

Figure 12:
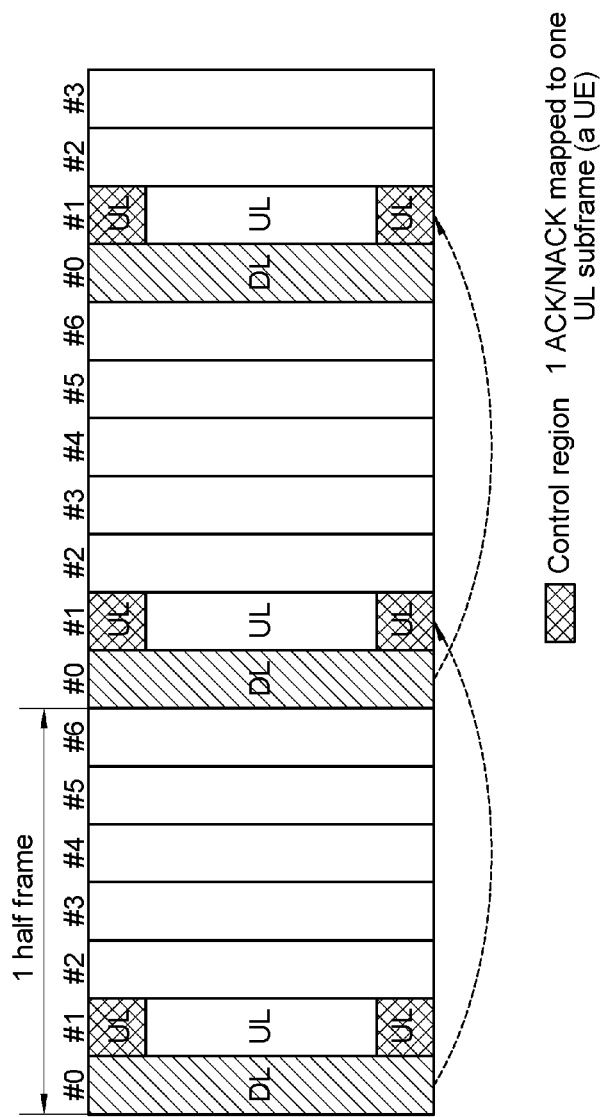
FIG. 12 is an exemplary view showing a scheduling method according to an embodiment of the present invention in a TDD system using one transmit antenna.

FIG. 12 is an exemplary view showing a scheduling method in a TDD system using one transmit antenna according to an embodiment of the present invention.

Referring to FIG. 12, when one transmit antenna is used, one downlink data is transmitted in one downlink subframe. Accordingly, one ACK/NACK signal is needed for the one downlink subframe. When BPSK modulation is used for the one downlink subframe, one uplink subframe is needed to transmit an ACK/NACK signal. It is because one ACK/NACK signal is mapped to one downlink subframe. For example, an ACK/NACK signal for the 0-th subframe, which is a downlink subframe, is transmitted on a control channel allocated to the control region of the 1-st subframe, which is an uplink subframe of the next half-frame.

Here, although the 0-th subframe is allocated as a downlink subframe and the 1-st subframe is allocated as an uplink subframe in the half-frame, this is merely an example.

When BPSK modulation is used, subframes can be allocated in the manner of (1, ~1), (3, ~3), (4, ~3), (5, ~2), and (6, ~1). The number of ACK/NACK signals that can be transmitted in an uplink subframe by a user is limited to one when BPSK modulation is used. Since two or more ACK/NACK signals cannot be transmitted on one uplink subframe, accordingly, it is preferable to limit the downlink subframe needed for transmission of downlink data to one.

When QPSK modulation is used, subframes can be allocated in the manner of (1, ~2), (2, ~4), (3, ~4), (4, ~3), (5, ~2), and (6, ~1). Since a 2-bit signal can be transmitted in QPSK, two 1-bit ACK/NACK signals can be simultaneously transmitted. Accordingly, on the basis of one user, ACK/NACK signals for two downlink subframes can be transmitted using one uplink subframe.

Although examples of BPSK and QPSK are described here, those skilled in the art may easily apply the spirit of the present invention to higher modulation orders.

Figure 13:
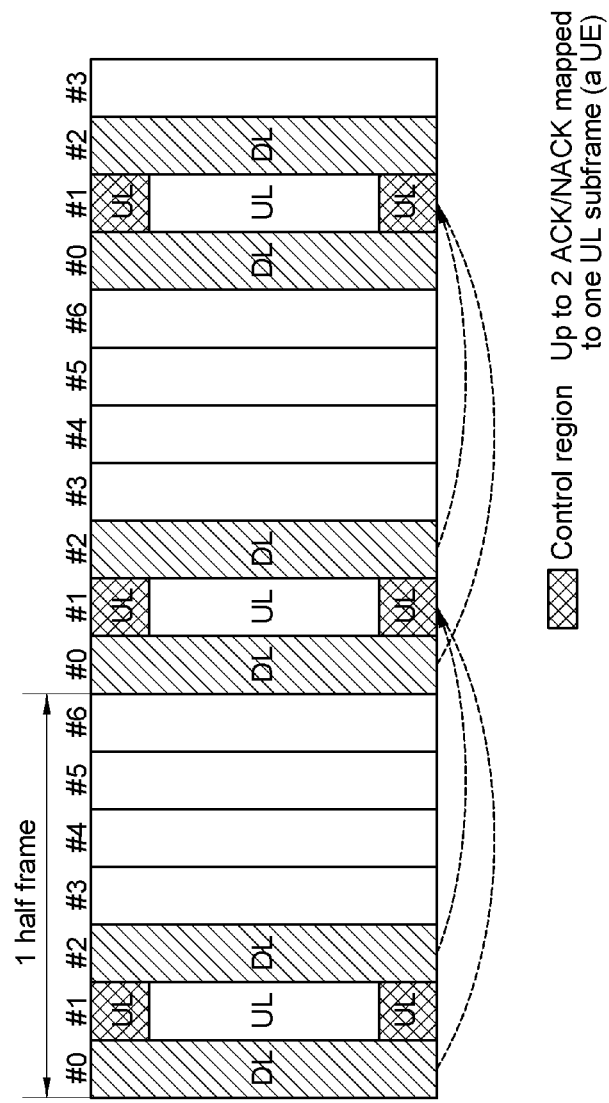
FIG. 13 is an exemplary view showing a scheduling method according to an embodiment of the present invention in a TDD system of rank 1 using multiple transmit antennas.

FIG. 13 is an exemplary view showing a scheduling method in a TDD system of rank 1 using multiple transmit antennas according to an embodiment of the present invention.

Referring to FIG. 13, when multiple transmit antennas are used and the rank is 1, one downlink subframe transmits one downlink data. Accordingly, one ACK/NACK signal is needed for one downlink subframe. When two pairs of constellation points are used in BPSK modulation, two ACK/NACK signals can be transmitted on one uplink subframe.

For example, ACK/NACK signals for the 0-th and 2-nd subframes, which are downlink subframes, are transmitted on a control channel of the 1-st subframe, which is an uplink subframe of the next half-frame.

When two ACK/NACK signals are transmitted in BPSK modulation, subframes can be allocated in the manner of (1, ~2), (2, ~4), (3, ~4), (4, ~3), (5, ~2), and (6, ~1). Or, when only one ACK/NACK signal is transmitted through a pair of constellation points, subframes can be allocated in the manner of (1, ~1), (3, ~3), (4, ~3), (5, ~2), and (6, ~1).

When QPSK modulation is used, subframes can be allocated in the manner of (1, ~2), (2, ~4), (3, ~4), (4, ~3), (5, ~2), and (6, ~1). Since a 2-bit signal can be transmitted in QPSK, two 1-bit ACK/NACK signals can be simultaneously transmitted. Accordingly, on the basis of one user, ACK/NACK signals for two downlink subframes can be transmitted using one uplink subframe.

Figure 14:
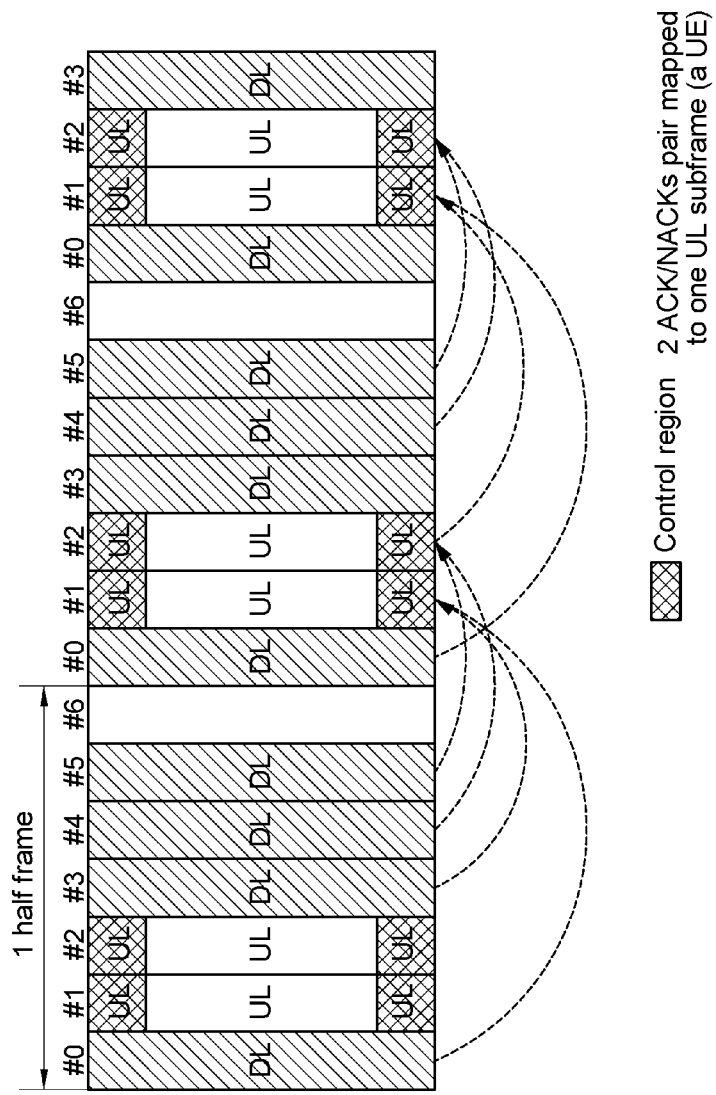
FIG. 14 is an exemplary view showing a scheduling method according to another embodiment of the present invention in a TDD system of rank 1 using multiple transmit antennas.

FIG. 14 is an exemplary view showing a scheduling method in a TDD system of rank 1 using multiple transmit antennas according to another embodiment of the present invention.

Referring to FIG. 14, when multiple transmit antennas are used and the rank is 1, one downlink subframe transmits one downlink data. It is different from the embodiment of FIG. 13 in that two uplink subframes are allocated to one half-frame. Accordingly, one half-frame can transmit ACK/NACK signals for maximum four downlink subframes.

Figure 15:
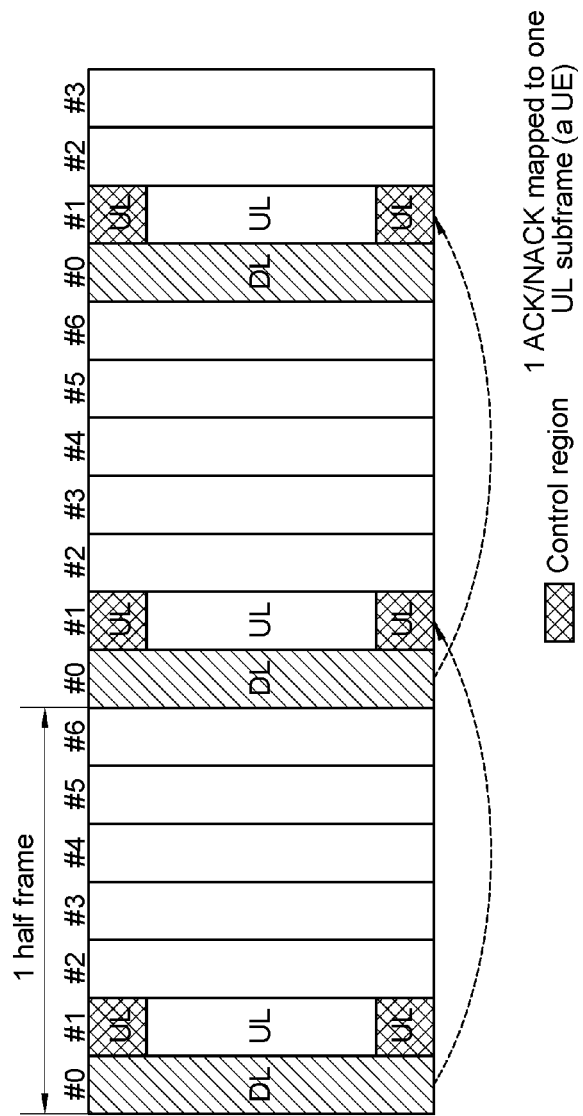
FIG. 15 is an exemplary view showing a scheduling method according to an embodiment of the present invention in a TDD system of rank 2 using multiple transmit antennas.

FIG. 15 is an exemplary view showing a scheduling method according to an embodiment of the present invention in a TDD system of rank 2 using multiple transmit antennas.

Referring to FIG. 15, a plurality of data (codewords) can be transmitted when multiple transmit antennas are used, and one downlink subframe transmits two codewords in the case of rank 2. Accordingly, two ACK/NACK signals for respective codewords are needed for one downlink subframe. QPSK or a higher order modulation can be used to transmit two ACK/NACK signals. For example, an ACK/NACK signal for the 0-th subframe, which is a downlink subframe, is transmitted on a control channel allocated to the control region of the 1-st subframe, which is an uplink subframe of the next half-subframe.

When QPSK modulation is used, subframes can be allocated in the manner of (1, ~1), (2, ~2), (3, ~3), (4, ~4), (5, ~5), (6, ~4), (7, ~3), (8, ~2), and (9, ~1). Since a 2-bit signal can be transmitted in QPSK, two 1-bit ACK/NACK signals can be simultaneously transmitted. Accordingly, on the basis of one user, an ACK/NACK signal for one downlink subframe can be transmitted using one uplink subframe.

Considering HARQ, a rule about allocation of subframes in a TDD system can be set as described below.

It is assumed that a 1-bit ACK/NACK signal is transmitted through BPSK modulation in a system that uses one transmit antenna. ACK/NACK signals for maximum two downlink subframes can be transmitted on one uplink control channel. Accordingly, when N uplink subframes are allocated, ACK/NACK signals for maximum 2N downlink subframes can be supported.

It is assumed that a 1-bit ACK/NACK signal is transmitted through BPSK modulation in a system of rank 1 that uses multiple transmit antennas. ACK/NACK signals for maximum two downlink subframes can be transmitted on one uplink control channel. Accordingly, when N uplink subframes are allocated, ACK/NACK signals for maximum 2N downlink subframes can be supported.

It is assumed that a 1-bit ACK/NACK signal is transmitted through BPSK modulation in a system of rank 2 that uses multiple transmit antennas. ACK/NACK signals for maximum two downlink subframes can be transmitted on one uplink control channel. Accordingly, when N uplink subframes are allocated, ACK/NACK signals for maximum N downlink subframes can be supported.

In addition, it is assumed that a channel quality indicator (CQI) is transmitted not simultaneously with an ACK/NACK signal. For the users that transmit both the ACK/NACK signal and CQI, at least two subframes among the entire subframes should be assigned for uplink subframes. That is, in order to transmit CQI, at least one more subframes than the number of uplink subframes currently used to transmit ACK/NACK signals are needed.

III. Error Handling Method

In a MIMO system of rank 1 according to the scheduling restriction method described above, when one uplink subframe is allocated to transmit a 1-bit ACK/NACK signal in BPSK modulation, maximum two downlink subframes can be supported. It is assumed that two downlink subframes are allocated to one user equipment.

Figure 16:
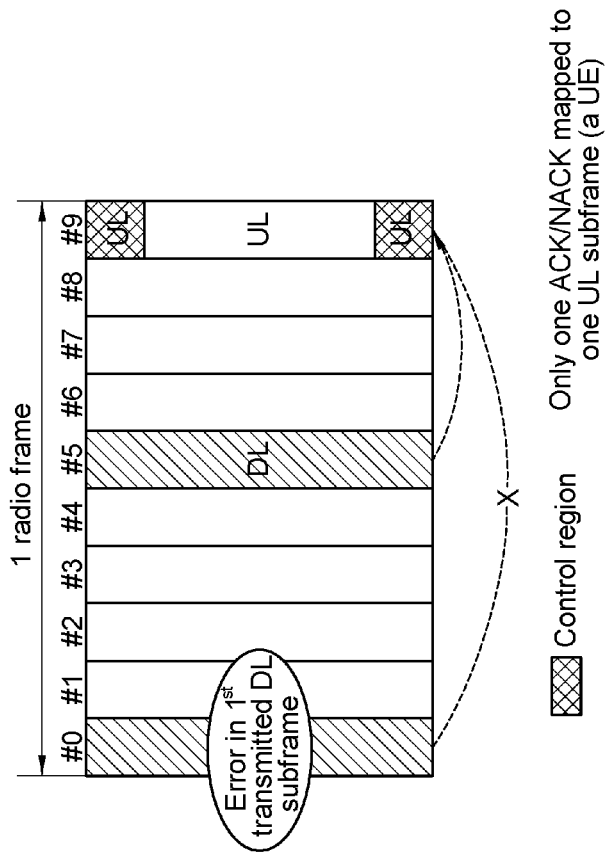
FIG. 16 is an exemplary view showing a case where an error is occurred for transmission of a downlink subframe.

FIG. 16 is an exemplary view showing a case where an error is occurred for transmission of a downlink subframe.

Referring to FIG. 16, the 0-th and 5-th subframes are allocated to a user equipment for downlink transmission, and the 9-th subframe is allocated to transmit ACK/NACK signals for the 0-th and 5-th subframes.

It is assumed that an error occurs in the first downlink subframe among the subframes and the user equipment receives only the second downlink subframe (the 5-th subframe).

Figure 17:
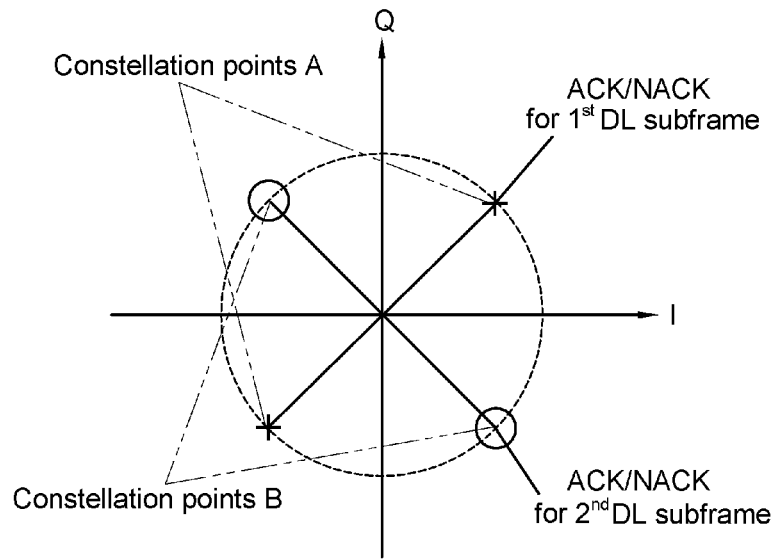
FIG. 17 shows a constellation diagram for an ACK/NACK signal.
Figure 17:
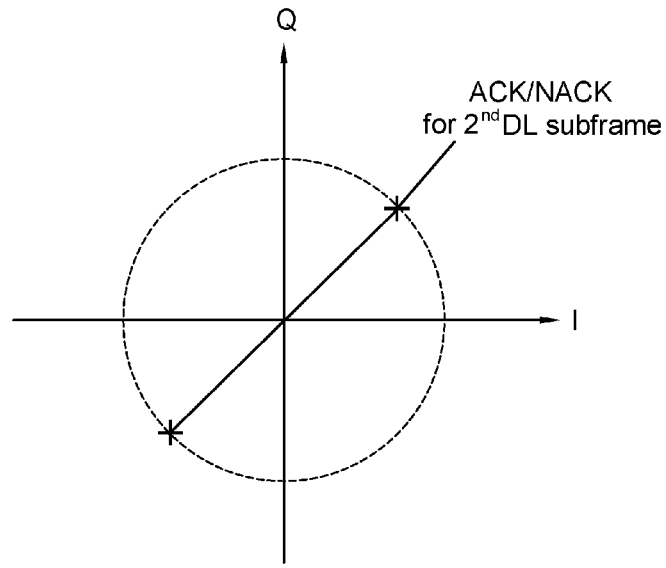

FIG. 17 shows a constellation diagram for an ACK/NACK signal. The upper portion is a normal case, and the lower portion is a case where an error occurs.

When downlink data is normally received, the user equipment transmits both of the ACK/NACK signal for the first downlink subframe (a first ACK/NACK signal, constellation point A) and the ACK/NACK signal for the second downlink subframe (a second ACK/NACK signal, constellation point B).

However, when an error occurs in the first downlink subframe and the user equipment receives only the second downlink subframe, the user equipment considers that the base station transmits only the second downlink subframe and transmits only an ACK/NACK signal for the first downlink subframe (constellation point A). It is since that the second downlink subframe transmitted from the base station becomes the first downlink subframe from the view point of the user equipment. Since the user equipment cannot detect an error situation of the first downlink subframe, the user equipment performs malfunction of transmitting the second ACK/NACK signal using a reserved resource region/sequence/position on the constellation map for the first ACK/NACK signal.

Contrarily, since whether an error occurs in the transmission of the first downlink subframe is unknown from the viewpoint of the base station, the base station determines both of the two ACK/NACK signals (the first and second ACK/NACK signals) will be transmitted through respective reserved resource regions/sequences/positions on the constellation map, and tries detection on both of a first control channel (a control channel associated with the first ACK/NACK signal) and a second control channel (a control channel associated with the second ACK/NACK signal). Although the base station tries to detect the first ACK/NACK signal in the resource region of the first ACK/NACK signal (constellation point A), the base station erroneously determines the second ACK/NACK signal transmitted by the user equipment as the first ACK/NACK signal. Subsequently, although the base station tries to detect the second ACK/NACK signal in the resource region of the second ACK/NACK signal, the base station will not obtain any information. Such a manifest error situation occurs as described.

Figure 18:
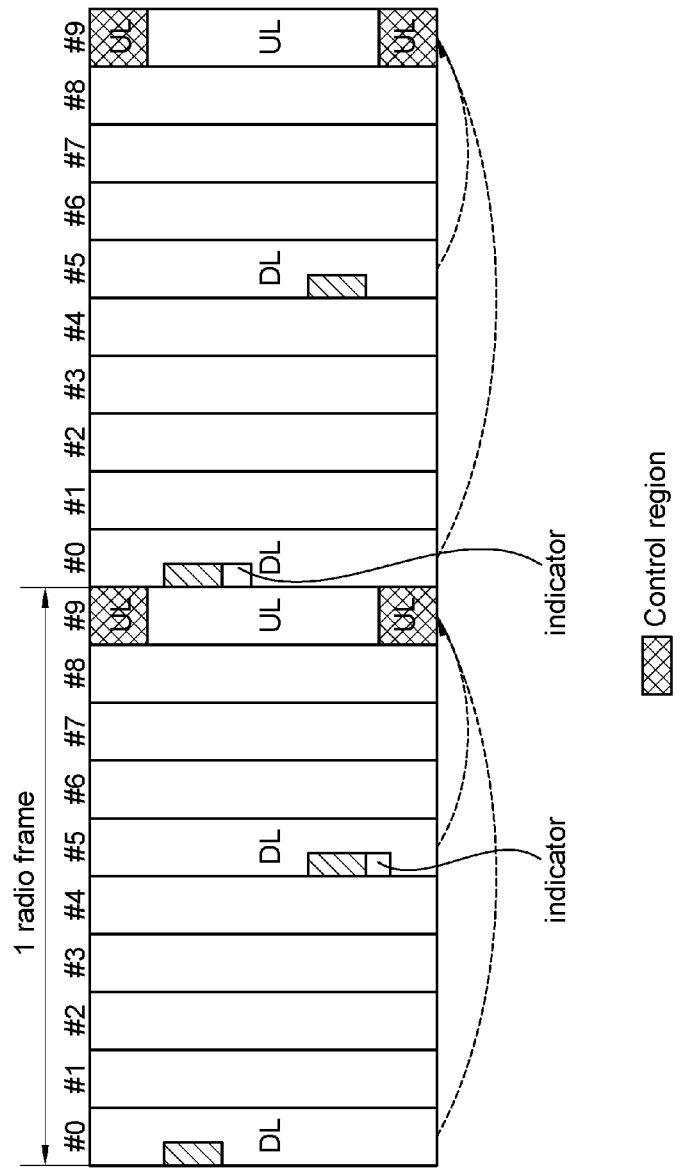
FIG. 18 is an exemplary view showing a method of handling an error according to an embodiment of the present invention.

FIG. 18 is an exemplary view showing a method of handling an error according to an embodiment of the present invention.

Referring to FIG. 18, when ACK/NACK signals for a plurality of downlink subframes are transmitted on one uplink subframe, an indicator is added to at least one downlink subframe to inform the user equipment that a plurality of downlink subframes is transmitted. The indicator is information for informing the user equipment that a plurality of downlink subframes is transmitted.

For example, it is assumed that the 0-th and 5-th subframes are used as downlink subframes and the 9-th subframe is used as an uplink subframe. The base station informs the user equipment through the indicator included in the 5-th subframe that the 0-the subframe is transmitted. Or, the base station may inform the user equipment through the indicator included in the 0-th subframe that the 5-th subframe is transmitted.

The indicator may have one or more number of bits. The indicator may be included in at least one or more downlink subframes. To which downlink subframe the indicator is loaded can be changed depending on the ratio of uplink to downlink, ACK/NACK signal modulation method, and the like.

Through the indicator and an additional detection procedure in the base station, the error situation can be overcome.

A case where the ratio of uplink to downlink is UL/DL=1:K (K<=2) is considered. The indicator is transmitted on a control channel of the second downlink subframe. Through the second downlink subframe, it is informed to the user equipment that the first downlink subframe is previously transmitted. It is assumed that a 1-bit indicator is used as an example. If "indocator=0", it means that only one downlink subframe is transmitted for a predetermined time period, and if "indocator=1", it means that at least one downlink subframe is previously transmitted before the downlink subframe where the indicator is included. Although an error occurs in a previous downlink subframe, the user equipment can be informed of whether an error occurs through the indicator.

A case where the ratio of uplink to downlink is UL/DL=1:K (K>2) is considered. Depending on the structure of the ACK/NACK signal, one uplink subframe can support K downlink subframes.

In an embodiment, the indicator may be included in one downlink subframe. At this point, the indicator needs N bits (N>1). The N-bit indicator may express information on the total number of related downlink subframes. For example, when ACK/NACK signals are configured in 16QAM, ACK/NACK signals for maximum four downlink subframes can be transmitted. That is, one uplink subframe can support four downlink subframes. In this case, the indicator is loaded on the last downlink subframe, and the value of N should be at least 2 or more. In the case of 16QAM ACK/NACK signals, at least a 2-bit indicator is needed in order to inform the number of downlink subframes where errors occur. An indicator having more number of bits (e.g., 4 bits) is needed in order to inform the positions of the downlink subframes, as well as the number of downlink subframes where the errors occur.

In another embodiment, for K downlink subframes related to one uplink subframe, an M-bit (M<K, e.g., M=1) indicator is added to all downlink subframes except the first downlink subframe. The indicator expresses information on whether the immediately previous downlink subframe is transmitted and has an error, and the like. If the downlink subframes are consecutively allocated, the indicator can be expressed in one bit. If the downlink subframes are not consecutively allocated, further more number of bits will be needed for the indicator.

In still another embodiment, for K downlink subframes related to one uplink subframe, a P-bit (total number of previous downlink subframes) indicator can be transmitted on every downlink subframe to inform the number of downlink subframes transmitted from the first downlink subframe to the downlink subframe immediately previous to the current downlink subframe. In this case, the first downlink subframe does not include an indicator.

A method of handling an error using an indicator in a MIMO system of rank 1 will be described below.

(1) When an Error Occurs in the First Downlink Subframe

Through the indicator included in the second downlink subframe, the user equipment (UE) may know the fact that the first downlink subframe has been previously transmitted. Accordingly, the second ACK/NACK signal (constellation point B), not the first ACK/NACK signal (constellation point A), is transmitted for the second downlink subframe.

Since the base station does not know that there is an error in the first downlink subframe, the base station expects that the first and second ACK/NACK signals will be respectively transmitted at constellation points A and B and starts a detection process. Since no signal is actually transmitted at constellation point A, the base station may immediately know the existence of the first ACK/NACK signal. The base station detects that the first ACK/NACK signal is not transmitted and thus knows that there is an error in the first ACK/NACK signal as a result. Subsequently, the base station tries to detect the second ACK/NACK signal at the position of constellation point B. Accordingly, the base station can detect the error in the first downlink subframe and successfully receive the ACK/NACK signal of the second downlink subframe.

(2) When an Error Occurs in the Second Downlink Subframe

Although the indicator is included in the second downlink subframe, it is assumed that the scheduling restriction rule described above is applied. The UE transmits a first ACK/NACK signal due to the error occurred in the second downlink subframe, but does not transmit a second ACK/NACK signal. The base station confirms whether there is signal energy at the position of constellation point A and may detect the first ACK/NACK signal. Subsequently, although the base station tries to detect the position of constellation point B, no signal will be detected. Accordingly, the base station can detect the error in the second downlink subframe.

In addition, when two uplink subframes and four downlink subframes are mapped to each other, it can be processed in the same manner as the case where a rule about previously mapping two downlink subframes to one uplink subframe is applied.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting data in a time division duplex (TDD) system, the method comprising:

transmitting downlink data in a plurality of downlink subframes to a user equipment, each transmitted downlink subframe corresponding to a different constellation point set of a plurality of constellation point sets, wherein acknowledgement/negative acknowledgement (ACK/NACK) signals of each transmitted downlink subframe are mapped to constellation points included in the constellation point set corresponding to the transmitted downlink subframe, and wherein a last downlink subframe of the transmitted downlink subframes includes an indicator that indicates a number of the transmitted downlink subframes;

receiving an uplink subframe including one or more ACK/NACK signals, each ACK/NACK signal at the constellation point of the constellation point set determined by the user equipment to correspond to one of the transmitted downlink subframes that was received by the user equipment, wherein the determination by the user equipment is based on the indicator;

determining that one of the constellation point sets does not include the ACK/NACK signal;

determining that the transmitted downlink subframe corresponding to the constellation point set that does not include the ACK/NACK signal is a failed downlink subframe that failed to transmit downlink data; and re-transmitting the downlink data that failed to transmit via the failed downlink subframe.

2. The method of claim 1, wherein an ACK/NACK signal for a first downlink subframe is detected via a first constellation point set, an ACK/NACK signal for a second downlink subframe is detected via a second constellation point set, and the second constellation point set is rotated by a fixed phase relative to the first constellation point set when the plurality of downlink subframes comprise the first downlink subframe and the second downlink subframe.

3. The method of claim 2, wherein each of the received ACK/NACK signals is modulated via binary phase shift keying (BPSK) by using the first constellation point set or the second constellation point set.

4. The method of claim 1, wherein the ACK/NACK signals are received via an uplink control channel of the uplink subframe.

5. The method of claim 1, wherein the ACK/NACK signals are received with other data via an uplink data channel of the uplink subframe.

6. A method of transmitting feedback information in a time division duplex (TDD) system, the method comprising:

receiving one or more downlink subframes of a transmitted plurality of downlink subframes, each transmitted downlink subframe corresponding to a different constellation point set of a plurality of constellation point sets, wherein acknowledgement/negative acknowledgement (ACK/NACK) signals of each transmitted downlink subframe are mapped to constellation points included in the constellation point set corresponding to the transmitted downlink subframe, and wherein a last downlink subframe of the one or more received downlink subframes includes an indicator that indicates a number of the transmitted downlink subframes;

determining a failed downlink subframe of the transmitted downlink subframes based on the number of transmitted downlink subframes indicated by the indicator;

determining the constellation point set corresponding to each of the one or more received downlink subframes based on the determination of the failed downlink subframe; and transmitting, in an uplink subframe, an ACK/NACK signal at one of the constellation points of each constellation point set determined to correspond to one of the received one or downlink subframes.

7. The method of claim 6, wherein an ACK/NACK signal for a first downlink subframe is mapped to a first constellation point set, an ACK/NACK signal for the second downlink subframe is mapped to a second constellation point set, and the second constellation point set is rotated by a fixed phase relative to the first constellation point set when the plurality of downlink subframes comprise the first downlink subframe and the second downlink subframe.

8. The method of claim 7, further comprising:

transmitting only one ACK/NACK signal using a corresponding constellation point set when downlink data is received via only the first downlink subframe or the second downlink subframe.

* * * * *